(12) United States Patent
Marin et al.

(10) Patent No.: US 9,745,043 B2
(45) Date of Patent: Aug. 29, 2017

(54) AIRCRAFT FUSELAGE FRAME ELEMENT INTEGRATING TABS FOR THE FASTENING OF STIFFENERS

(71) Applicant: Airbus Operations (S.A.S.), Toulouse (FR)

(72) Inventors: Yannick Marin, L'Isle Jourdain (FR); Damien Guilloteau, Toulouse (FR); Emilie Luche, Lias (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 14/448,768

(22) Filed: Jul. 31, 2014

(65) Prior Publication Data
US 2015/0034763 A1 Feb. 5, 2015

(30) Foreign Application Priority Data

Aug. 1, 2013 (FR) ...................... 13 57676

(51) Int. Cl.
*B64C 1/00* (2006.01)
*B64C 1/06* (2006.01)

(52) U.S. Cl.
CPC .............. *B64C 1/061* (2013.01); *B64C 1/064* (2013.01); *Y10T 29/49622* (2015.01)

(58) Field of Classification Search
CPC . B61C 1/061; B61C 1/064; B64C 2001/0072; B64C 2001/0081; B64C 1/069; Y02T 50/433
USPC .................................................. 244/119, 131
See application file for complete search history.

(56) References Cited

U.S. PATENT DOCUMENTS

| | | | |
|---|---|---|---|
| 2,620,008 A | 12/1952 | Mallard |
| 2,680,497 A | 6/1954 | Miller |
| 3,036,521 A | 5/1962 | Owen |
| 3,083,429 A | 4/1963 | Barlow |
| 3,117,610 A | 1/1964 | Matthews |
| 3,165,968 A | 1/1965 | Anstett |
| 3,177,915 A | 4/1965 | La Fleur et al. |
| 3,241,658 A | 3/1966 | Anderson |
| 3,467,417 A | 9/1969 | Ollis et al. |

(Continued)

FOREIGN PATENT DOCUMENTS

| CA | 2367728 A1 | 7/2002 |
|---|---|---|
| CN | 201 496 349 | 6/2010 |

(Continued)

OTHER PUBLICATIONS

French Search Report for Application No. 1357676 dated May 14, 2014.

(Continued)

*Primary Examiner* — Richard G Davis
(74) *Attorney, Agent, or Firm* — Jenkins, Wilson, Taylor & Hunt, P.A.

(57) ABSTRACT

In order to reduce the time and the cost of manufacturing an aircraft fuselage, the subject matter disclosed herein provide an aircraft fuselage frame element comprising a core provided with at least one through-opening intended for the passing of a fuselage stiffener, and further comprising, associated with each opening, a tab for the fastening of the frame element onto the fuselage stiffener, with the tab being a single piece with the core and connected to the latter by a fold that delimits the opening.

18 Claims, 3 Drawing Sheets

(56) References Cited

U.S. PATENT DOCUMENTS

| | | | |
|---|---|---|---|
| 3,648,749 A | 3/1972 | Warren | |
| 3,704,507 A | 12/1972 | Grube | |
| 3,711,931 A | 1/1973 | Ladouceur et al. | |
| 3,845,860 A | 11/1974 | Ladouceur | |
| 3,967,528 A | 7/1976 | Baker | |
| 3,999,659 A | 12/1976 | Grube | |
| 4,203,204 A | 5/1980 | Murphy | |
| 4,310,132 A * | 1/1982 | Frosch | B64C 1/068 244/119 |
| 4,310,964 A | 1/1982 | Murphy | |
| 4,412,820 A | 11/1983 | Brummond et al. | |
| 4,946,386 A | 8/1990 | Kidd et al. | |
| 4,995,146 A | 2/1991 | Woods | |
| 5,105,515 A | 4/1992 | Nelson | |
| 5,116,178 A | 5/1992 | Lerman et al. | |
| 5,142,764 A | 9/1992 | Whiteside | |
| 5,242,523 A * | 9/1993 | Willden | B29C 70/44 156/245 |
| 5,273,426 A | 12/1993 | Dragan | |
| 5,314,065 A | 5/1994 | Ayres | |
| 5,477,596 A | 12/1995 | Schlosstein et al. | |
| 5,564,564 A | 10/1996 | Poffenberger | |
| 5,596,859 A * | 1/1997 | Horton | E04B 2/7453 52/481.1 |
| 5,632,583 A | 5/1997 | Schneider et al. | |
| 5,775,514 A | 7/1998 | Lin | |
| 5,878,880 A | 3/1999 | Poffenberger | |
| 5,927,491 A | 7/1999 | Room | |
| 5,964,072 A * | 10/1999 | Rasmussen | E04B 1/24 52/666 |
| 6,073,326 A | 6/2000 | Banks et al. | |
| 6,088,897 A | 7/2000 | Banks et al. | |
| 6,134,940 A | 10/2000 | Banks et al. | |
| 6,141,848 A | 11/2000 | Yousko et al. | |
| 6,158,666 A | 12/2000 | Banks et al. | |
| 6,210,084 B1 | 4/2001 | Banks et al. | |
| 6,332,299 B1 * | 12/2001 | Stewart, III | E04B 1/2608 52/506.05 |
| 6,626,904 B1 | 9/2003 | Jammet et al. | |
| 6,708,821 B2 | 3/2004 | Tucker et al. | |
| 6,889,414 B2 | 5/2005 | Korsedal | |
| 7,237,996 B2 | 7/2007 | Vrana | |
| 7,427,180 B2 | 9/2008 | Ladoucer | |
| 7,704,151 B2 | 4/2010 | Vrana | |
| 7,735,780 B2 | 6/2010 | Coles | |
| 7,882,948 B2 | 2/2011 | West | |
| 8,142,125 B2 | 3/2012 | Vrana | |
| 8,235,634 B2 | 8/2012 | Larsen et al. | |
| 8,720,730 B2 | 5/2014 | Bodden | |
| 8,784,028 B2 | 7/2014 | Clark | |
| 8,899,522 B2 * | 12/2014 | Vinue Santolalla | B64C 1/064 244/119 |
| 9,088,146 B2 | 7/2015 | Schnoor et al. | |
| 9,232,965 B2 | 1/2016 | Hawkes | |
| 9,527,606 B2 | 12/2016 | Marin et al. | |
| 2004/0237281 A1 | 12/2004 | Korsedal | |
| 2005/0013679 A1 | 1/2005 | Ladoucer | |
| 2007/0246876 A1 | 10/2007 | Wood et al. | |
| 2007/0297870 A1 | 12/2007 | Vrana | |
| 2008/0128550 A1 | 6/2008 | Roming | |
| 2010/0282937 A1 | 11/2010 | Schnoor et al. | |
| 2010/0295227 A1 | 11/2010 | Hung | |
| 2011/0020091 A1 | 1/2011 | Larsen et al. | |
| 2011/0042519 A1 | 2/2011 | Tacke | |
| 2012/0011693 A1 | 1/2012 | Amirehteshami et al. | |
| 2012/0184384 A1 | 7/2012 | Dieter | |
| 2014/0031647 A1 | 1/2014 | Lin et al. | |
| 2014/0101923 A1 | 4/2014 | Clark | |
| 2015/0001343 A1 | 1/2015 | Bernadet et al. | |
| 2015/0034766 A1 | 2/2015 | Marin et al. | |
| 2015/0040369 A1 | 2/2015 | Marin et al. | |

FOREIGN PATENT DOCUMENTS

| | | |
|---|---|---|
| DE | 10 2006 051 457 | 5/2008 |
| DE | 10 2009 056 999 | 6/2011 |
| EP | 2 565 117 | 3/2013 |
| FR | 1 345 076 | 12/1963 |
| FR | 2 489 779 | 3/1982 |
| FR | 2 507 943 | 12/1982 |
| FR | 2 977 296 | 1/2013 |
| GB | 2 494 775 | 3/2013 |
| GB | 2510170 A | 7/2014 |
| WO | WO 2010/118448 | 10/2010 |

OTHER PUBLICATIONS

French Search Report for Application No. 1357764 dated Apr. 4, 2014.

French Search Report for Application No. 1357672 dated Apr. 3, 2014.

Non-Final Office Action for U.S. Appl. No. 14/448,779 dated Mar. 17, 2016.

Non-Final Office Action for U.S. Appl. No. 14/448,807 dated Mar. 17, 2016.

Final Office Action for U.S. Appl. No. 14/448,807 dated Sep. 15, 2016.

Notice of Allowance for U.S. Appl. No. 14/448,779 dated Sep. 16, 2016.

Advisory Action and Interview Summary for U.S. Appl. No. 14/448,807 dated Dec. 7, 2016.

Non-Final Office Action for U.S. Appl. No. 14/448,807 dated Feb. 9, 2017.

\* cited by examiner

AIRCRAFT FUSELAGE FRAME ELEMENT INTEGRATING TABS FOR THE FASTENING OF STIFFENERS

CROSS-REFERENCE TO RELATED APPLICATION

This application claims priority to French Patent Application No. 13 57676 filed on Aug. 1, 2013, the entire content of which is incorporated by reference herein.

DESCRIPTION

Technical Field

The subject matter disclosed herein relates to the field of aircraft fuselages, and in particular to that of the fastening of a fuselage frame element onto stiffeners provided on the skin of this fuselage.

The subject matter disclosed herein applies more particularly, but not exclusively, to the field of commercial aircraft.

Background

Aircraft fuselages are designed to resist loads induced by the pressurisation and the loads transmitted by the engines.

To this effect, fuselages usually include frames extending circumferentially, also referred to as "orbital frames", as well as an aerodynamic skin, sometimes referred to as "self-stiffened skin", fastened onto these circumferential frames and provided with stiffeners that usually extend longitudinally, which are fastened onto a inner face of the skin and which are generally referred to as "stringers".

The stringers can have sections of varied types, for example as a T, I, J or Ω. In certain known configurations, the circumferential frames have a footing directly fastened onto the inner face of the self-stiffened skin, in which case the frames comprise notches/openings for the passing of the stringers. In other known configurations, the stringers are inserted between the circumferential frames and the self-stiffened skin, with the frames then passing above the stringers.

In both cases, and in particular in the latter case, attach angles commonly referred to as "clips" are arranged between the stringers, and provide the connection of the circumferential frames with the skin and/or with the longitudinal stiffeners.

However, the clips are set into place on the frame and fastened one after the other. This individual treatment of each clip makes the assembly process expensive, all the more so that the number of clips associated with each fuselage frame is very substantial. In addition, this phase of manufacturing of the fuselage generally requires the presence of many operators inside the section of fuselage concerned, due to the substantial number of fastening clips. Consequently, it can be difficult to simultaneously accomplish other assembly tasks from inside the section when the operators are installing and fastening these clips, which constitutes another factor for penalising the manufacturing time and costs.

There is therefore a need to optimise this phase of installing and of fastening clips, in order to limit the impact of it on the total cost of manufacturing the fuselage.

SUMMARY

The subject matter disclosed herein therefore has for purpose to overcome at least partially the aforementioned disadvantages, relating to achievements of prior art.

To do this, the subject matter disclosed herein first has for object an aircraft fuselage frame element comprising a core provided with at least one through-opening intended for the passing of a fuselage stiffener, with the frame element further comprising, associated with each opening, a tab for the fastening of the frame element onto the fuselage stiffener, the tab being a single piece with the core and connected to the latter by a fold that delimits the opening.

The subject matter disclosed herein breaks with the current technique based on the use of clips fastened by riveting to the frame element, since the latter integrates tabs that fulfil an analogous function. Also, as they are already integrated into the frame element, these tabs facilitate the manufacture of the fuselage, for which the time and the costs of manufacturing are advantageously reduced.

From this stems a rationalisation of the operations, with in particular the suppression of the step of fastening clips onto the fuselage frame element. Moreover, once the frame element is installed on the other fuselage elements, these tabs can be fastened simply and quickly, which limits the number of operators that have to intervene within the fuselage. Other assembly operations can as such be conducted simultaneously in the section of fuselage concerned, with for consequence a reduction in the time and the total cost of manufacturing the fuselage. This advantage is further pronounced when such an operation of fastening of the tabs is automated, for example using robots.

The subject matter disclosed herein preferentially has one or several of the optional characteristics described hereinbelow.

Each opening can be an opening according to a direction of the height of the frame element, the fold forming the bottom of the opening and being opposite an opening portion of this opening, arranged on a footing of the frame element.

The tab is inclined by an angle of approximately 90° in relation to the core.

The fuselage frame element has a section in the general shape of a C, S, Z, I, J, L, T or Ω. Of course, this is the section in the portions of the frame element that are not provided with tabs.

The fuselage frame element comprises several openings spaced apart according to a longitudinal direction of the frame element, with a tab associated with each of the openings.

The fuselage frame element can be a thermosetting or thermoplastic material, preferably a composite material comprising a mixture of resin and fibres.

The tab is accomplished or carried out by folding a partially cut-out portion within the frame element.

The fuselage frame element extends over an angular sector of a magnitude of 30 to 120°. Other angular extents remain possible, without leaving the scope of the subject matter disclosed herein.

The fuselage frame element further comprises a stabilizer that connects the tab and the core, with this stabilizer being preferentially added onto the remainder of the frame.

The stabilizer takes the form of a section reinforcement in the shape of an L, with more preferably a triangular rib that connects the base and the branch of the L. Here, the base and the branch of the L are respectively intended to be thrust and fastened onto the core of the frame and the tab, or inversely.

The subject matter disclosed herein also has for object an assembly for aircraft fuselage comprising at least one stiffener as well as at least one fuselage frame element such as described hereinabove, with the stiffener passing through the opening of the frame element and being fastened to the latter using the tab thrust against the stiffener.

Preferably, the tab is fastened to the stiffener par rivets, bolts, welds, gluing, or polymerisation of the tab in contact with the stiffener.

Preferably, the assembly further comprises a stabilizer that connects the tab and the core of the fuselage frame element.

The subject matter disclosed herein also has for object an aircraft fuselage comprising at least one assembly such as described hereinabove, as well as a fuselage skin whereon is fastened each stiffener of the assembly.

The subject matter disclosed herein also has for object an aircraft comprising such a fuselage.

Finally, the subject matter disclosed herein also has for object a method for manufacturing an aircraft fuselage frame element such as described hereinabove, with the method comprising the following steps:

carrying out of notches through the fuselage frame element after the manufacture of the latter or during its manufacture, in such a way as to obtain at least one partially cut-out portion located between two notches;

folding of the partially cut-out portion in such a way as to release the opening and form the tab.

Preferably, the method further comprises a step that aims to remove, at least partially, a portion of the partially cut-out portion located on a footing of the frame element. This removal is carried out more preferably by cutting of the preferably cut-out portion. This removal can be carried out at various stages of the implementation of the method of manufacture.

Other advantages and characteristics of the subject matter disclosed herein shall appear in the detailed non-restricted description hereinbelow.

BRIEF DESCRIPTION OF THE DRAWINGS

This description shall be made with regards to the annexed drawings wherein.

DETAILED DESCRIPTION

Figure 1:
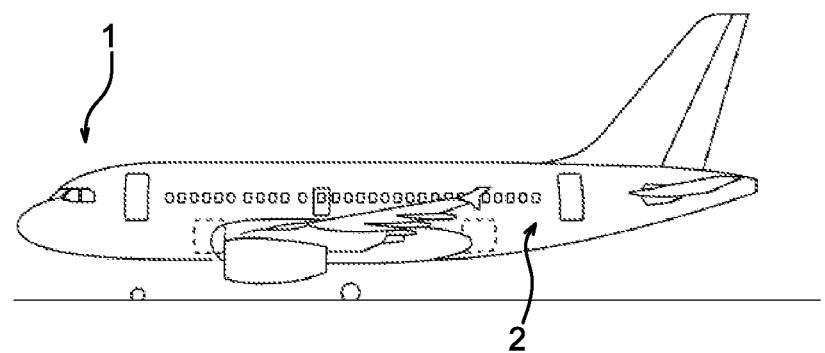
FIG. 1 shows a side view of an aircraft comprising an aircraft fuselage according to the subject matter disclosed herein.
Figure 2:
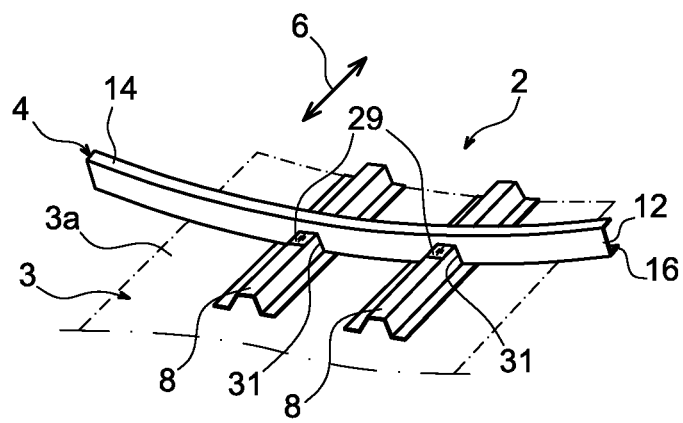
FIG. 2 shows an enlarged view of a portion of the fuselage shown in the preceding figure, seen from the inside of the aircraft.

Referring to FIG. 1, a commercial aircraft 1 is shown provided with a fuselage 2, of which a portion is shown in more detail in FIG. 2, with this portion of the fuselage 2 being seen from inside the aircraft.

The fuselage 2 comprises a skin 3 of which the inner face 3a fixedly carries fuselage frames 4, of which only one of them is shown in FIG. 2. This frame 4 extends over all or a portion of the periphery of the fuselage, in a transverse plane of the aircraft, i.e. a plane orthogonal to the direction 6 corresponding to the longitudinal and axial direction of the aircraft. Each frame can be a single piece, or formed using several frame elements/sections that each form only one single angular sector of the frame, with these elements then being assembled end-to-end. Typically, a frame element extends over an angular sector by a magnitude of 30 to 120°. For convenience, in the rest of the description, the frame element that can be seen in FIG. 2 and in the following figures shall be referred to as "frame 4". It is however noted that the other frame elements that constitute the frame have a design that is identical or similar to that which shall be presented hereinbelow, and which is proper to the subject matter disclosed herein.

Moreover, the fuselage 2 comprises a plurality of longitudinal stringers 8 which are stiffeners, taking the form of reinforcements that pass through the frames 4. All of the stringers 8 extending according to the longitudinal direction 6 are fastened to the inner face 3a of the skin, by conventional structure, such as rivets. The stringers 8 here have a transverse section in the general shape of $\Omega$, but could have other shapes known to those skilled in the art.

Each frame 4 comprises a core 12 which is the central vertical portion shown in FIG. 2, at the end of which is located the heel 14, and at the other end of which is located the footing 16. Conventionally, the core that connects the heel and the footing is similar to the central portion of the stiffener. Here, the footing 16 is intended to be facing the skin 3, possibly in contact with the latter, and possibly fastened to this same skin. However, it is more preferably retained a solution wherein the footing 16 is not directly fastened to the skin 3, with the fastening of the frames 4 to this skin being carried out only indirectly via their fastening to the stringers 8, which are themselves directly fastened to the skin.

The heel 14 constitutes the free end of the stiffener, opposite the end formed by the footing.

In the embodiment shown, the section of the frame 4 has the general shape of a "C" with the core 12 substantially perpendicular to the heel 14 and to the footing 16, forming, respectively, the opposite ends of the frame. However, angles different from 90° can be retained for certain frames 4, in particular for those located at the front end and at the rear end of the aircraft. Other general section shapes are however possible, for example as an I, Q, etc. Hollow sections can also be considered, without leaving the scope of the subject matter disclosed herein.

As mentioned hereinabove, the fuselage 2 does not comprise conventional fastening clips, usually intended for providing the fastening of the fuselage frames 4 onto the skin 3 and/or onto the stringers 8 provided on the skin.

On the other hand, the frame element 4 integrates tabs 29 for the fastening of the stringers 8 which pass through it on the openings 31 released by these tabs.

Figure 3:
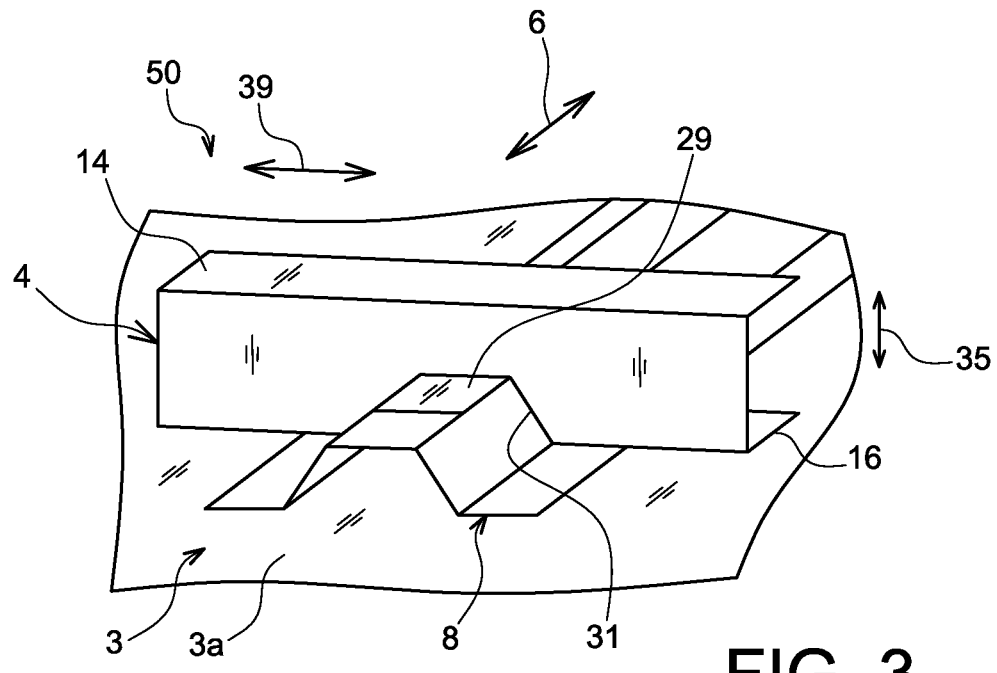
FIG. 3 shows a perspective view of an assembly that is an integral part of the fuselage shown in the preceding figures, with this assembly comprising a fuselage frame element fastened to a stiffener.
Figure 4:
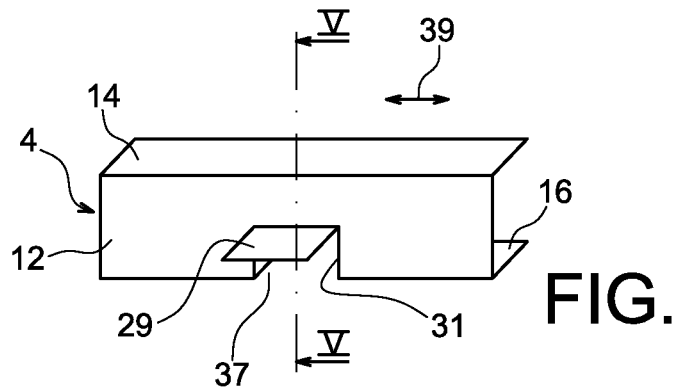
FIG. 4 shows a perspective view of the fuselage frame element shown in the preceding figure.
Figure 5:
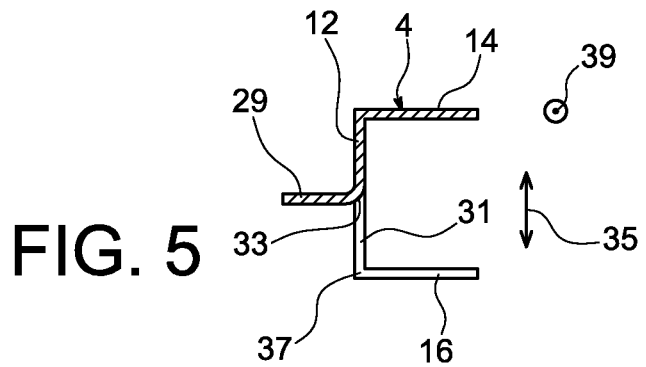
FIG. 5 shows a cross-section view according to the line V-V of FIG. 4.

More precisely in reference to FIGS. 3 to 5, the frame 4 therefore comprises, associated with each through-opening 31, a tab 29 for the fastening of this frame on the stringer 8 passing through the opening 31. The latter is carried out or exists as a single piece integrated with the core 12 and connected to and extending from the latter by a fold 33 that delimits the opening, by forming a bottom of this same opening. The opening 31 is as such realized opening according to a direction 35 of the height of the frame, with the fold 33 forming the bottom of the opening and being opposite an opening portion 37 arranged on the footing 16.

The tab 29 is substantially planar, inclined by approximately 90° in relation to the core 12. As shall be described hereinafter, one of the particularities of the subject matter disclosed herein resides in the fact that the tab is carried out by folding on the partially cut-out portion within the frame element.

In addition, note that the frame 4 comprises several openings 31 spaced apart according to the longitudinal direction 39 of this frame. An opening 31 is in fact provided for the passing of each stringer 8, fastened to the frame by the intermediary of the tab 29 associated with this opening. The frame 4 and each stringer 8 fastened to the latter together form an assembly 50 proper to the subject matter disclosed herein, intended to be an integral part of the fuselage 2.

In this embodiment, the tab 29 is therefore fastened onto the head of the stiffener 8, but the footing 16 could also be fastened to the legs of this same stiffener 8 against which this footing is pressing. The fastening can be carried out in an analogous manner, with rivets or similar items. As such, in the portions located between the stiffeners, the frame 4 is not connected to the skin 3, and a clearance is even preferentially provided between the inner face of the skin 3a and the footing 16. This clearance is more preferably substantially identical to the thickness of the legs of the stiffeners 8, against which the footing 16 is pressing.

The frame 4 is preferably a thermosetting or thermoplastic material, in particular a composite material comprising a mixture of reside and fibres, preferably carbon and/or glass fibres.

Figure 7A:
FIGS. 7a to 7c diagrammatically show different steps of a method of manufacturing the fuselage frame element shown in FIGS. 3 to 5, according to a preferred embodiment of the subject matter disclosed herein.
Figure 7B:
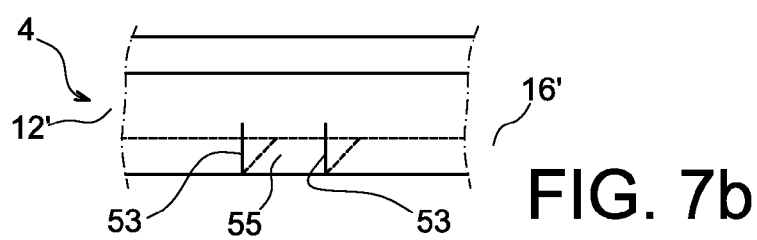
Figure 7C:
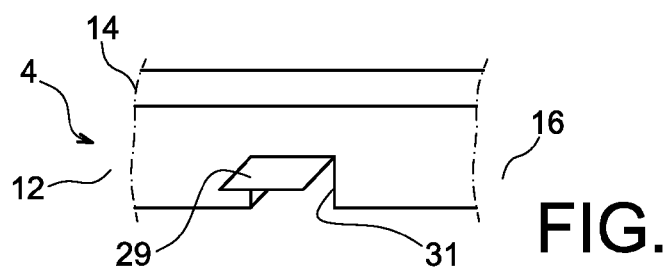

In this regard FIGS. 7a to 7c diagrammatically show different steps in the method of manufacturing such a frame 4, made of composite material.

Firstly in reference to FIG. 7a, a set of impregnated folds 4' is stacked, then notches 53 are made through this stack in such a way as to obtain a partially cut-out portion 55 between two notches.

Then, as shown in FIG. 7b, the stack is formed in such a way as to have a section in the general shape of a C that is substantially identical to the final section desired for the frame 4. Also, the notches 53 and the partially cut-out portion extend on the portion 12' of the stack intended to form the core of the frame, but also on the portion 16' of the stack intended to form the footing.

A step of polymerising the resin is then provided, during which the frame 4 is obtained by hardening under the effect of the heat. This step of polymerising is conventional, and can be implemented by any means known to those skilled in the art.

Then, a folding at 90° is carried out or made of the partially cut-out portion, in such a way that it forms the tab 29, as is shown in FIG. 7c. It is also during this folding that the through-opening 31 is released.

For the forming of the tab 29, the portion of the partially cut-out portion located on the footing can be removed after the folding or before the latter. It can also be removed after or before the polymerisation, and, in this latter case, before or after the forming of the stack that aims to confer upon it the general shape of a C. However, if it is preferentially provided that the length of the tab corresponds to the height of the opening that opens into the core of the frame, the length of this tab could be higher, according to the extent of the removal carried out on the footing of the frame.

Once the frame 4 is obtained with the method which has just been described, it is preferentially brought inside the section of fuselage and installed on the stringers 8 already fastened to the skin 3. During this installation, the heads of the stringers 8 are therefore inserted into the openings 31, and the tabs 29 thrust against these same heads. It is then sufficient to proceed with the fastening of these tabs 29 onto the heads of the stringers, preferably in an automated manner, for example with robots. This considerably reduces the implementation time of this step of fastening of the frame onto the stringers. An analogous operation can be implemented for the possible fastening of the footing 16 onto the legs of the stringers 8.

As no operation of fastening clips onto the frame is required, the subject matter disclosed herein reduces the time and the costs of manufacturing the fuselage. The latter can indeed be subject to other assembly tasks when the frames are manufactured exteriorly to the section. In addition, thanks to a reduced encumbrance of the robots, other assembly tasks can be carried out inside the section during the fastening of the tabs on the stringers. In any case, as the number of fastenings is reduced, the same is true for the number of operators/robots present within the section in order to provide the assembly of the frames onto the stringers. Consequently, other tasks can be carried out simultaneously within this section, in order to further reduce the time and the cost of manufacturing this fuselage.

Furthermore, the subject matter disclosed herein is also advantageous in that the material removed for the formation of the openings for the passing of stringers is judiciously retained in order to form structure of fastening the frame onto these stringers. This confers a gain in material, since in the solutions of prior art, this removed material was simply discarded, without being functionalised, and in particular not intended to form all or a portion of the fastening clips.

For the fastening of the tabs 29 onto the stringer heads 8, conventional structure for fastening can be considered such as rivets, bolts, or an adhesive such as for example a thermosetting adhesive inserted between the two already hardened elements.

Alternatively, the polymerisation of the tabs 29 can be considered when they are placed in contact with the stringer heads 8. To do this, the initial polymerisation of the frame 4 is to be implemented without concerning the tabs 29, then hardened only later. In this case, the adherence to the stringers would result from the polymerisation of the tabs arranged in contact with the stringer heads 8.

Another possibility resides in the implementing of a step of copolymerisation of several frames 4 and stringers 8, by placing them in the same tool.

Of course, the various techniques for fastening mentioned hereinabove can be combined together.

The preferred technique will be the copolymerisation of several frames, tabs and stiffener elements and the skin, with the whole in the same single mould, or a technique in two steps via local welding of each tab onto its associated stiffener polymerised beforehand. When the frame is made from a thermoplastic material, identical or analogous fastening possibilities are offered. Another possibility resides however in the welding of thermoplastic tabs onto the stringer heads, preferably also carried out in a thermoplastic material. Here, the tabs are cut and then folded after the manufacture of the frame.

More generally, any method can be provided that aims for the carrying out of notches through the frame 4 after the manufacture of the latter or during its manufacture, for example before it is formed and/or before its polymerisation for the case of a thermosetting material, in such a way as to obtain at least one partially cut-out portion located between two notches. Then, a folding of the partially cut-out portion is carried out, in such a way as to release the opening and form the tab, as has been described hereinabove. The folding can also be carried out during or after the manufacture of the frame.

Figure 6:
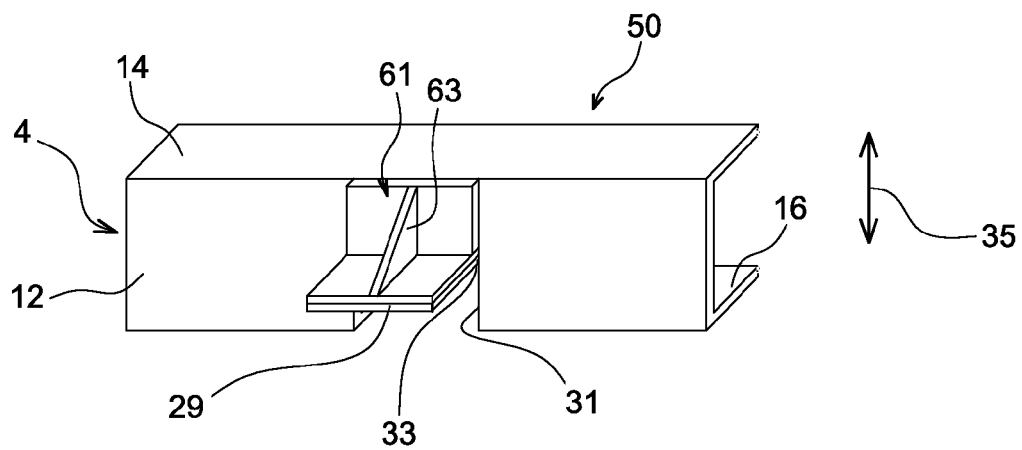
FIG. 6 shows a view analogous to that of FIG. 4, according to another embodiment.

In reference to FIG. 6, another preferred embodiment is shown wherein the assembly 50 further comprises a stabilizer 61 that connects the tab 29 and the core 12 of the frame 4. The stabilizer 61 can take the form of a section reinforcement in the shape of an L, with a triangular rib that connects the base and the branch of the L. The base of the L is therefore thrust and fastened against the tab 29, while its branch is thrust and fastened against the core 12. Note that the triangular rib 63 is shown centred on the L, but that it can alternatively be off-centre, for example in such a way as to form a chest corner or similar with the L. The stabilizer 61 reinforces the mechanical maintaining of the frame 4 on the stringer 8, already provided by the fastening of the tab 29 onto the stringer head. Moreover, note that fastening of the rivet type can successively pass through the stabilizer 61, the tab 29 and the stringer head 8.

Of course, various modifications can be made by those skilled in the art to the subject matter disclosed herein that has just been described, solely by way of non-restricted examples.

The invention claimed is:

1. An aircraft fuselage frame element comprising:
   a heel;
   a footing;
   at least one core, which comprises one or more through-openings for passing of a fuselage stiffener through at least a portion of the at least one core; and
   a tab associated with at least one of the one or more through-openings for fastening the aircraft fuselage frame element onto the fuselage stiffener,
   wherein the tab:
      is a single piece with the at least one core comprising the one or more through-openings,
      is connected to the at least one core at the one or more through-opening by a fold that defines the through-opening,
      extends from the at least one core at the one or more through-opening formed therein at a position above a bottom edge of the at least one core from which the tab is formed as the single piece,
      comprises a folded partially cut-out portion of the at least one core having the one or more through-opening formed therein within the aircraft fuselage frame element, and
      is formed from less than a full height of the at least one core, so that the tab is not substantially coplanar with the heel,
   wherein the aircraft fuselage frame element is configured to reinforce a fuselage skin of an aircraft fuselage, and
   wherein, in an area of the fuselage stiffener, the aircraft fuselage frame element is not, when assembled with the fuselage stiffener in an aircraft fuselage, directly joined to the fuselage skin.

2. The aircraft fuselage frame element according to claim 1, wherein:
   each of the one or more through-openings is coplanar with the at least one core of the aircraft fuselage frame element,
   the fold comprises an upper edge of the one or more through-openings, and
   a lower edge of the at least one core of the aircraft fuselage frame element comprises a bottom edge of the one or more through-openings.

3. The aircraft fuselage frame element according to claim 1, wherein the tab is inclined by an angle of approximately 90° in relation to the at least one core.

4. The aircraft fuselage frame element according to claim 1, wherein the aircraft fuselage frame element has a section in a general shape of a C, S, Z, I, J, L, T or Ω.

5. The aircraft fuselage frame element according to claim 1, wherein the one or more through-openings comprise a plurality of through-openings spaced apart according to a longitudinal direction of the aircraft fuselage frame element, a tab being associated with each of the plurality of through-openings.

6. The aircraft fuselage frame element according to claim 1, further comprising a thermosetting or thermoplastic material.

7. The aircraft fuselage frame element according to claim 6, wherein the thermosetting or thermoplastic material is a composite material comprising a mixture of resin and fibres.

8. The aircraft fuselage frame element according to claim 1, wherein the aircraft fuselage frame element further comprises a stabilizer that directly connects the tab and the at least one core.

9. The aircraft fuselage frame element according to claim 8, wherein the stabilizer comprises a section reinforcement in a shape of an L, with a triangular rib that connects a base and a branch of the L.

10. An assembly for an aircraft fuselage comprising at least one fuselage stiffener and at least one aircraft fuselage frame element according to claim 1, the fuselage stiffener passing through the one or more through-openings of the aircraft fuselage frame element and being fastened to the aircraft fuselage frame element using the tab against the fuselage stiffener.

11. The assembly according to claim 10, wherein the tab is fastened to the fuselage stiffener by rivets, bolts, welds, gluing, or polymerisation of the tab in contact with the fuselage stiffener.

12. An aircraft fuselage comprising at least one assembly according to claim 10 as well as a fuselage skin on which is fastened each fuselage stiffener of the assembly.

13. The aircraft fuselage according to claim 12, wherein a clearance is provided between an inner face of the fuselage skin and the footing.

14. An aircraft comprising at least one aircraft fuselage frame element according to claim 1.

15. A method for manufacturing an aircraft fuselage frame element according to claim 1, the method comprising:
   forming notches through the aircraft fuselage frame element on one edge of the aircraft fuselage frame element during or after manufacture of the aircraft fuselage frame element to obtain at least one partially cut-out portion located between two notches; and
   folding the partially cut-out portion to create the one or more through-openings and form the tab.

16. The method according to claim 15, comprising removing, at least partially, a portion of the partially cut-out portion.

17. An aircraft fuselage frame element comprising:
   a heel;
   a footing;
   a core section, which comprises a plurality of through-openings for passing of a fuselage stiffener through at least a portion of the core section; and a tab associated with each through-opening for fastening the aircraft fuselage frame element onto the fuselage stiffener, the tab being a single piece with the core section, connected to the core section by a fold that defines the through-opening, extending from the core section at a position above a bottom edge of the core section, formed from folding a partially cut-out portion of the core section, and oriented such that the tab is perpendicular to the core section and parallel to the heel and footing, wherein the aircraft fuselage frame element is configured to reinforce a fuselage skin of an aircraft fuselage, and wherein the aircraft fuselage frame element is not, when assembled with the fuselage stiffener in an aircraft fuselage, directly joined to the fuselage skin.

18. An aircraft fuselage comprising:
  at least one fuselage stiffener;
  a fuselage skin; and
  at least one aircraft fuselage frame element, which comprises:
    a heel;
    a footing; and
    at least one core,
      wherein the at least one core comprises at least one through-opening for passing of the fuselage stiffener through at least a portion of the at least one core, wherein the frame element further comprises, associated with each through-opening, a tab for fastening the frame element onto the fuselage stiffener, wherein the tab:
  is a single piece with the at least one core comprising the at least one through-opening,
  is connected to the at least one core at the at least one through-opening by a fold that defines the through-opening,
  extends from the at least one core at the at least one through-opening formed therein at a position above a bottom edge of the at least one core from which the tab is formed as the single piece,
  comprises a folded partially cut-out portion of the at least one core having the at least one through-opening formed therein within the frame element, and
  formed from less than a full height of the at least one core, so that the tab is not substantially coplanar with the heel, wherein at least one of the at least one fuselage stiffener is fastened to the at least one aircraft fuselage frame element by the tab against the fuselage stiffener, wherein each of the at least one fuselage stiffener is fastened on or to the fuselage skin, and wherein the footing is not directly joined to the fuselage skin.

* * * * *